United States Patent
Lin et al.

(10) Patent No.: US 6,596,249 B2
(45) Date of Patent: Jul. 22, 2003

(54) CU-AL/CE-AL COMPLEX OXIDE COMBUSTION CATALYSTS, THEIR PREPARATION AND USE

(75) Inventors: Bingxiong Lin, Beijing (CN); Wanjing Zhang, Beijing (CN); Yingjun Liu, Beijing (CN); Shijie Li, Beijing (CN); Neng Li, Beijing (CN)

(73) Assignee: Peking University, Beijing (CN)

( * ) Notice: Subject to any disclaimer, the term of this patent is extended or adjusted under 35 U.S.C. 154(b) by 169 days.

(21) Appl. No.: 09/826,174

(22) Filed: Apr. 4, 2001

(65) Prior Publication Data

US 2002/0061273 A1 May 23, 2002

(30) Foreign Application Priority Data

Sep. 29, 2000 (CN) .................................... 00 1 29260 A

(51) Int. Cl.$^7$ ................................................. B01J 8/00
(52) U.S. Cl. ..................................... 423/247; 502/304
(58) Field of Search .......................... 423/247; 502/304

(56) References Cited

FOREIGN PATENT DOCUMENTS

| | | |
|---|---|---|
| CN | 1072109 | 5/1993 |
| EP | 468127 | 1/1992 |

OTHER PUBLICATIONS

Park, P.W. et al, "The influence of surface on the catalytic activity of cerium promoted copper oxide catalysts on alumina: oxidation of carbon monoxide and methane" Catalysis Letters 50 (1998) 41–48.*

* cited by examiner

*Primary Examiner*—Stanley S. Silverman
*Assistant Examiner*—Maribel Medina-Sanabria
(74) *Attorney, Agent, or Firm*—Ladas & Parry

(57) ABSTRACT

The present invention relates to non-noble metal combustion catalyst for carbon monoxide comprising Cu—Al/Ce—Al complex oxides and aluminum oxide support. The catalysts comprise Ce—Al complex oxide and Cu—Al complex oxide successively loaded on the aluminum oxide support, wherein the loading weight ratio is 0.02–0.10 for Ce—Al—O/Al$_2$O$_3$ and 0.05–0.15 for Cu—Al—O/Al$_2$O$_3$, and the Cu—Al complex oxide is dispersed in cluster form on the surface of the aluminum oxide support pre-covered with high dispersed nanoparticles of the Ce—Al complex oxide. Furthermore, the present invention relates to a process for preparing the catalysts and their use as combustion promoter with high catalytic activity, high hydrothermal stability and ability of reducing NOx exhaust in the fluid catalytic cracking (FCC) process of petroleum refining.

22 Claims, 3 Drawing Sheets

CU-AL/CE-AL COMPLEX OXIDE COMBUSTION CATALYSTS, THEIR PREPARATION AND USE

TECHNICAL FIELD

The present invention relates to non-noble metal combustion catalysts for carbon monoxide comprising copper-aluminum/cerium-aluminum complex oxides and aluminum oxide support, their preparation and use in the Fluid Catalytic Cracking process (FCC) of the petroleum industry. More particularly, the present invention relates to non-noble metal combustion catalysts for carbon monoxide comprising copper-aluminum complex oxide uniformly dispersed in cluster form on the $Al_2O_3$ support pre-covered with highly dispersed microcrystals of Ce—Al complex oxide, a process for their preparation and their use in the FCC process of petroleum refining as carbon monoxide combustion catalysts with high catalytic activity, high hydrothermal stability and the ability to reduce the emission of $NO_x$.

BACKGROUND ART

In the FCC process of petroleum refining, the catalysts for catalytic cracking used in a vast amount usually need to be regenerated by the aid of the combustion catalysts for carbon monoxide. The combustion catalysts for carbon monoxide are called carbon monoxide combustion promoters (or promoters for short). Up to now, the combustion catalysts for carbon monoxide wildly used in the art all have noble metals of VIII group, such as Pt, Pd, etc, as their active component. In order to solve the problems of noble metal shortage and high production cost, non-noble metal carbon monoxide combustion catalysts, including perovskite-type complex oxides and non-perovskite type oxides, have been developed to substitute for all or part of noble metal (CN 1022542C and CN 1072109A etc). However, for these non-noble metal catalysts, neither their catalytic activity and stability, nor the reliability and facility of the related process, can be comparable to that achieved by using noble metal catalysts. For instance, the catalysts usually become inactive at the high temperature used in hydrothermal condition due to agglomeration of the active components and inevitable by-products. Therefore, researchers in the art have been making great efforts to improve the performances of the non-noble metal combustion catalysts.

The present inventors have developed two kinds of suitable complex oxides with imperfect structure on the bases of the structural chemistry principles. The interactions between two complex oxides make it possible for the catalytic active component to be uniformly dispersed on and firmly combined with the support, and thereby combustion catalysts for carbon monoxide having good performance and meeting the demands of industry have been prepared, showing a new progress in the art.

DISCLOSURE OF THE INVENTION

Therefore, an object of the present invention is to provide carbon monoxide combustion catalysts comprising metal complex oxides firmly combined with a support as catalytic component, which have high catalytic activity, high hydrothermal stability and the ability to achieve the conversion of CO and HC, and hence can be used to substitute for noble metal combustion catalysts for carbon monoxide. The catalyst of the present invention also has favorable effects in reducing the $NO_x$ exhaust and the contamination to the environment. It is also an object of the present invention to provide a process for preparing the non-noble metal combustion catalysts. Another object of the present invention relates to the use of the non-noble metal combustion catalysts as carbon monoxide combustion catalysts in the FFC process. Other objects of the present invention will be embodied in the following detailed description of the present invention.

The present invention relates to non-noble metal combustion catalysts for carbon monoxide comprising cerium-aluminum and copper-aluminum complex oxides successively loaded on aluminum oxide support, wherein the weight ratio between the two loaded complex oxides and the aluminum oxide support is respectively from 0.02 to 0.10, preferably 0.04–0.06 for Ce—Al complex oxide and 0.05–0.15, preferably 0.08–0.11 for Cu—Al complex oxide. Preferably, the Ce—Al complex oxide covering the surface of the aluminum oxide support is in the form of nanometer microcrystals with an imperfect structure, having a general formula of $[Ce_{1-y}Al_y][O_{2-y/2}\square_{y/2}]$ [I]; and the Cu—Al complex oxide is dispersed in cluster form on the microcrystals of the Ce—Al complex oxide covering the aluminum oxide support, having an imperfect structure and a general formula of $[Cu_{1-3x/2}Al_x\square_{x/2}]O$ [II]; wherein x=0.05–0.23, preferably x=0.10–0.17; and y=0.05–0.30, preferably y=0.10–0.22; $\square$ presents the vacancy in the crystal structure.

The present invention further relates to a process for preparing the aforesaid catalysts, which comprises:

A. impregnating the aluminum oxide support with an aqueous solution formed by mixing an aqueous solution comprising Ce—Al compounds, preferably Ce and Al salts, such as their nitrates, with citric acid or its aqueous solution in a citric acid/total Ce—Al metal ions molar ratio of 0.3–1.0, then the impregnated support being baked at 100–140° C. for 2–4 hrs, pyrolysated at 200–300° C. for 2–3 hrs, and then activated at 600–750° C. for 2–5 hrs, to obtain the solid $Al_2O_3$ support covered with microcrystals of Ce—Al complex oxide; and B. impregnating the solid obtained in the step A in an aqueous solution formed by mixing an aqueous solution comprising Cu—Al compounds, preferably Cu and Al salts, such as their nitrates, with citric acid or its aqueous solution in a citric/total Cu—Al metal ions molar ratio of 0.3–1.0, then the impregnated solid being baked at 100–150° C. for 2–4 hrs, pyrolysated at 200–300° C. for 2–3 hrs, and then activated at 500–650° C. for 2–3 hrs, to obtain the final catalyst which further comprises Cu—Al complex oxide dispersed on its surface pre-covered with the microcrystals of Ce—Al complex oxide.

The present invention also relates to the use of the aforesaid catalysts as carbon monoxide combustion catalyst in FCC process of petroleum refining.

BEST MODE FOR CARRYING OUT THE INVENTION

Figure 1:
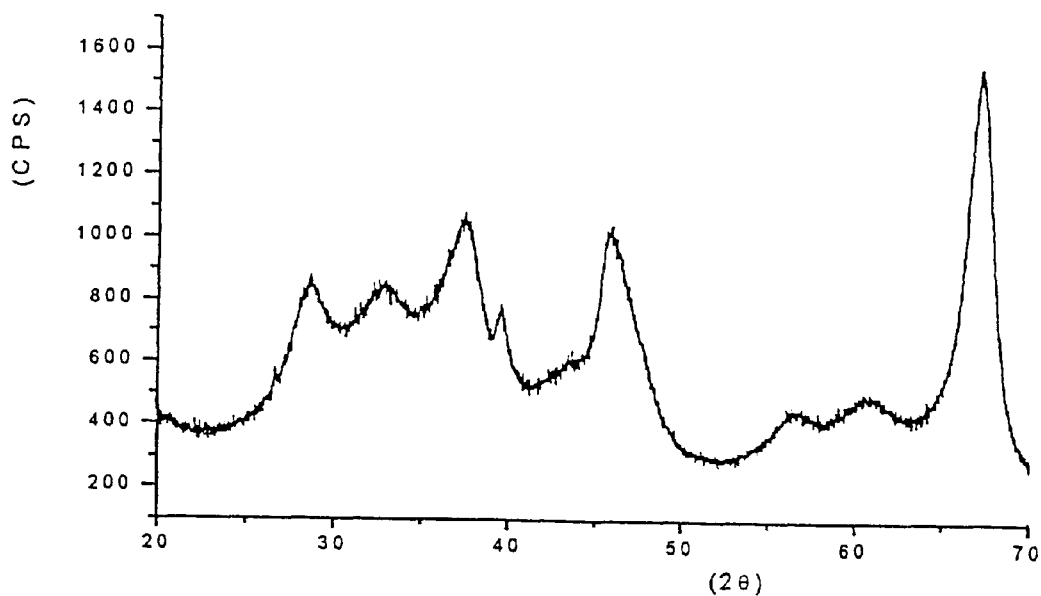
FIG. 1 is an X-ray diffraction pattern of the Ce—Al—O/ $\gamma$-$Al_2O_3$.

The study on the combustion catalysts for carbon monoxide formed by loading non-noble metal oxides, such as oxides of Cu,Co,Mn,Ce and rare earth or alkaline earth metals, as active components on various supports to substitute for all or part of noble-metal combustion catalysts has been carried out for many years in the art, and a variety of products have been made. However, the products which actually meet the requirements of having high activity, high mechanical strength and long service life concurrently, and hence can be used to substitute for the noble metal catalysts currently used in industry, are seldom seen. It should be noticed that, these products generally have a relatively high initial activity as combustion catalyst, but the hydrothermal stability which relates to the service life is usually low, while the hydrothermal stability under the circumstance surrounded by the FCC catalysts is most hard to come by. Moreover, the catalysts must meet a series of requirements for production in industrial scale, which include that the preparing process must be simple, and the raw materials must be wildly available and inexpensive. It is obvious that there are many difficult to be solved. Based on an intensive study for many years, the present inventors have developed novel non-noble metal combustion catalysts for carbon monoxide which meet the aforesaid requirements.

The present invention relates to non-noble metal combustion catalysts comprising copper-aluminum/cerium-aluminum complex oxides successively loaded on aluminum oxide support, with a loading weight ratio of 0.02–0.10, preferably 0.04–0.06, for Ce—Al—O/Al$_2$O$_3$; and 0.05–0.15, preferably 0.08–0.11, for Cu—Al—O/Al$_2$O$_3$. The supports used are generally native or synthesized solid materials of aluminum oxide, including the metastable type of aluminum oxide with a mesophase, such as γ-Al$_2$O$_3$. The shape of the support materials is not critical, and the materials in the form of grain, sphere, ellipsoid, ring, honeycomb, strip or other special shape all can be used.

As active component of the catalysts of the present invention, the Ce—Al complex oxide and Cu—Al complex oxide are fixed on the support surface in the form of nanoparticles. In terms of the results of X-ray diffraction, the Ce—Al complex oxide can be expressed as an imperfect structure having the following formula [I]

$$[Ce_{1-y}Al_y][O_{2-y/2}\square_{y/2}] \qquad [I]$$

wherein y=0.05–0.30, preferably y=0.10–0.22, and □ represents the vacancy in the structure; the Cu—Al complex oxide can be expressed as an imperfect structure having the following formula [II]

$$[Cu_{1-3x/2}Al_x\square_{x/2}]O \qquad [II]$$

wherein x=0.05–0.23, preferably x=0.10–0.17; and □ represents the vacancy in the structure.

As used here, the abbreviation "Ce—Al—O" means a Ce—Al complex oxide having Ce, Al and O as its main components; and "Cu—Al—O" means a Cu—Al complex oxide having Cu, Al and O as its main components.

Since the Ce—Al complex oxide is possessed of the imperfect structure, the interaction of the metastable type of aluminum oxide with the Ce—Al complex oxide must be stronger than that with CeO$_2$, and hence the Ce—Al complex oxide can be loaded on the γ-Al$_2$O$_3$ support in a high dispersed form. On the other hand, since a strong interaction exists between the aforesaid Ce—Al and Cu—Al complex oxides, the Cu—Al complex oxide will be almost totally attached to the Ce—Al complex oxide and scarcely contact with γ-Al$_2$O$_3$ when the Cu—Al complex oxide is loaded on the Al$_2$O$_3$ support pre-covered with the microcrystals of Ce—Al complex oxide, and hence reducing effectively the destruction probability of the active components due to the interaction between the Cu ions in the active components and the Al ions in the aluminum oxide support. Therefore, the Ce—Al complex oxide and Cu—Al complex oxide of the present invention can be successively and directly loaded on the aluminum oxide support as active components, being able to exert their catalytic effect stably at the high temperature of hydrothermal condition. Furthermore, the Ce—Al complex oxide covering the surface of the aluminum oxide support is preferably in the form of microcrystals, particularly in the form of nanoparticules with a size less than 10 nanometers; also preferred is that the Cu—Al complex oxide is dispersed in cluster form on the aluminum oxide support pre-covered with the microcrystals of the Ce—Al complex oxide.

The process for preparing the catalysts of the present invention comprises:

A. Impregnating the aluminum oxide support in a mixed solution formed by mixing an aqueous solution comprising Ce—Al compound with citric acid or its aqueous solution, and the impregnated support being baked at 100–140° C. for 2–4 hrs., pyrolysated at 200–300° C. for 2–3 hrs, and then activated at 600–750° C. for 2–5 hrs, to obtain the solid aluminum oxide support covered with microcrystals of Ce—Al complex oxide; and B. Impregnating the solid obtained in the aforesaid step A in a mixed solution formed by mixing an aqueous solution comprising Cu—Al compound with citric acid or its aqueous solution, and the impregnated support being baked at 100–150° C. for 2–4 hrs, pyrolysated at 200–300° C. for 2–3 hrs, and then activated at 500–650° C. for 2–3 hrs, to obtain the final catalyst which further comprises Cu—Al complex oxide dispersed on its surface pre-covered with the microcrystals of the Ce—Al complex oxide.

The Cu, Al, and Ce compounds used in the process of the present invention are generally water-soluble, and can be their salts, such as copper nitrate, aluminum nitrate and cerous nitrate etc. They can be used in the form of solution, preferably in the form of aqueous solution with concentrations of 0.50–4.00 mol/L, preferably 2.00–3.50 mol/L for Cu compound; 1.00–2.20 mol/L, preferably 1.50–2.00 mol/L for Al compound; 0.50–4.00 mol/L, preferably 1.00–2.00 mol/L for Ce compound. The citric acid can be used directly or in the form of its aqueous solution. In general, the citric acid or its aqueous solution is mixed uniformly with the aqueous solutions of Ce and Al compounds or Cu and Al compounds, respectively, in a citric acid/total metal ions molar ratio of 0.3–1.0, preferably 0.4–0.8, to obtain their complex solution.

The aluminum oxide support used in the present invention can be of the metastable type alumina, for example, γ-Al$_2$O$_3$. The shape of the support material is not critical, and the material in the form of grain, sphere, ellipsoid, ring, honeycomb, strip or other special shape all can be used. However, it is preferred that the support of the CO combustion catalysts in the FCC process for petroleum refining are in microsphere or powdered microcrystal form, and most preferably, microspheres with a particle size of 10–200 μm, preferably 20–100 μm. In a preferred embodiment, 65–85 wt. % of the support has a particle size of 40–80 μm, and the weight per cent of the support particles with a size larger than 80 μm is less than 20 wt %. Typically the support has a water-absorbility of 0.50–0.65 ml/g, preferably 0.55–0.60 ml/g.

In a specific embodiment of the present invention process, the catalysts were prepared according to the following preferred procedures. The following analysis and description are presented for illustrating the present invention, and are not intended to bond the present invention into a certain theory.

1. The Loading of the Ce—Al Complex Oxide

An aqueous solution comprising cerous nitrate and aluminum nitrate in an appropriate molar ratio was prepared, and citric acid was added into the solution in a citric acid/total metal ions molar ratio of 0.3–1.0. After mixing uniformly to allow complexation reaction taking place, a part of the complex solution was taken as required to impregnate the γ-$Al_2O_3$ support. The impregnated $Al_2O_3$ support was baked at 100–140° C. for 2–4 hrs., pyrolysated at 200–300° C. for 2–3 hrs, and then activated at 600–750° C. for 2–5 hrs. After cooling, the solid γ-$Al_2O_3$ covered with microcrystals of the Ce—Al complex oxide, Ce—Al—O/γ-$Al_2O_3$, was obtained, wherein the weigh ratio of the Ce—Al—O to γ-$Al_2O_3$ was 0.04–0.06. The γ-$Al_2O_3$ was in spherical form with a water-absorbility of 0.50–0.65 ml/g, in which 65–85 wt % of the γ-$Al_2O_3$ particles had a particle size of 40–80 μm, and less than 20 wt % of the γ-$Al_2O_3$ particles had a particle size larger than 80 μm. The X-ray diffraction pattern of the solid support prepared by the aforesaid method is shown in FIG. 1.

In the present invention, the Ce—Al—O complex oxide instead of $CeO_2$ was used, since the two oxides have different crystalline state.

Figure 2:
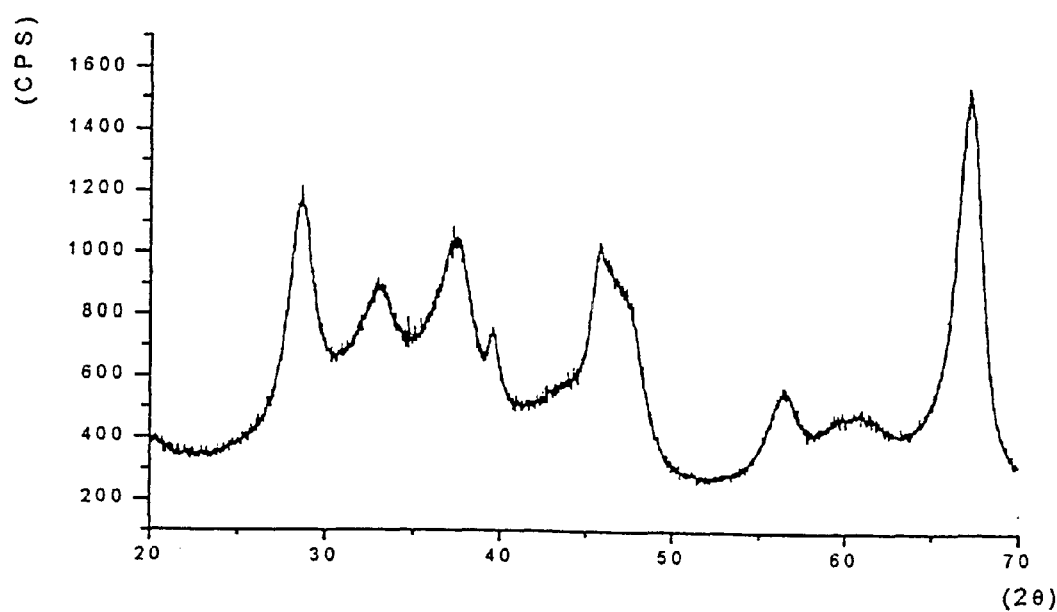
FIG. 2 is an X-ray diffraction pattern of the $CeO_2$/$\gamma$-$Al_2O_3$.

To interpret this more clearly, the $CeO_2$/γ-$Al_2O_3$ was prepared by impregnating γ-$Al_2O_3$ in a cerous nitrate solution with a certain concentration (the weight ratio of the $CeO_2$ to γ-$Al_2O_3$ is 0.05) under the same process condition for loading the Ce—Al complex oxide. The XRD pattern of the product is shown in FIG. 2. Comparing FIG. 1 with FIG. 2, it is not difficult to find that the full width at half maximum of the Ce—Al—O phase in FIG. 1 broadens obviously, indicating that the grain size of the Ce—Al—O dispersed on the surface of the γ-$Al_2O_3$ is smaller than that of $CeO_2$. To obtain a quantitative result, two samples of single phase of $CeO_2$ and Ce—Al—O without γ-$Al_2O_3$ support were prepared to avoid the interference of the X-ray diffuse scattering of the γ-$Al_2O_3$ on the XRD intensity measurement of the complex oxides.

The sample containing merely oxide of Ce (2#) was prepared by using cerous nitrate as staring material, and the sample of the complex oxide containing both of Ce and Al ions (3#) in a Ce/Al molar ratio of 8.1 was also prepared. Their XRD patterns are shown in FIG. 3 and FIG. 4, respectively.

Figure 3:
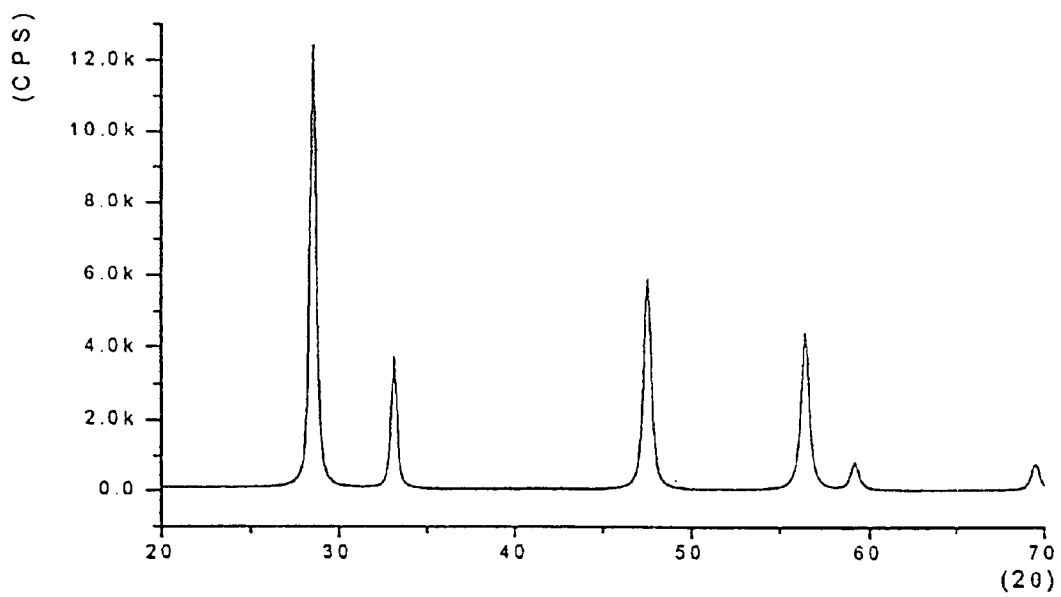
FIG. 3 is an X-ray diffraction pattern of the $CeO_2$.
Figure 4:
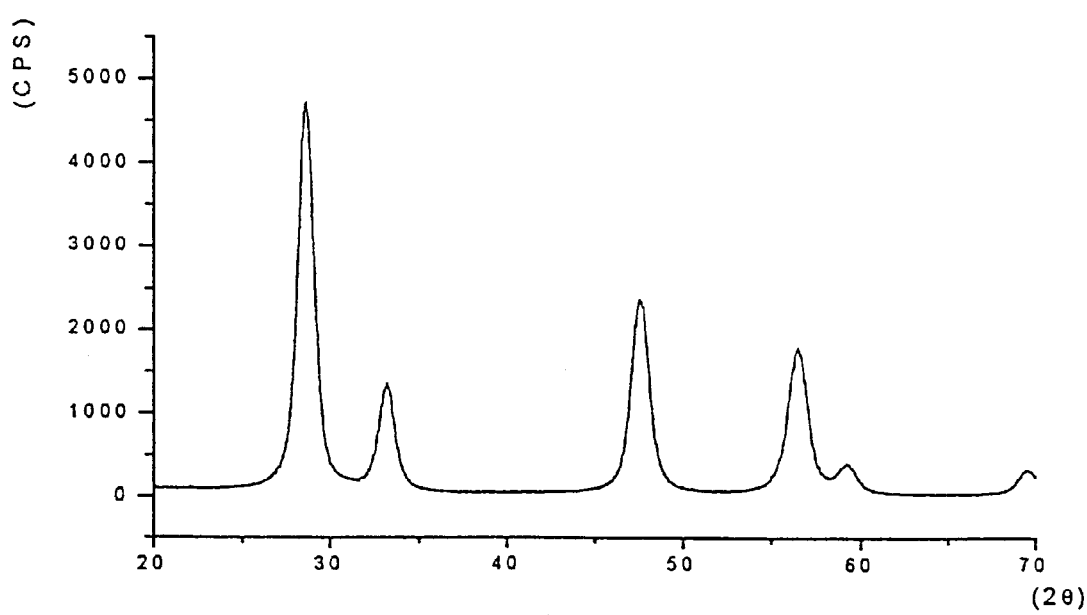
FIG. 4 is an X-ray diffraction pattern of the Ce—Al—O.

It can be seen from FIG. 3 that the sample 2# is a pure phase of $CeO_2$. The background of the XRD pattern in FIG. 4 is normal, the interplanar distance d and the distribution of the diffraction intensity I are the same with those of $CeO_2$, and no γ-$Al_2O_3$ phase can be detected, implying that the most part of the $Al^{3+}$ ions in the sample 3# have entered into the lattice of the $CeO_2$ and the Ce—Al complex oxide with a formula of $[Ce_{1-y}Al_y][O_{2-y/2}\square_{y/2}]$ and the structure of $CeO_2$ was formed. In terms of the X-ray diffraction peak broadening, the $D_{110}$ of the $CeO_2$ in sample 2# was determined to be 250 Å, while the $D_{110}$ of the Ce—Al—O in sample 3# was 75 Å, wherein $D_{110}$ represents the dimension of the grain in the 110 direction. These results indicate that the Ce—Al—O will cover the surface of the γ-$Al_2O_3$ in a high dispersed form when it is loaded on the surface of the γ-$Al_2O_3$, and the bare part of the γ-$Al_2O_3$ surface relatively diminishes.

2. The Preparation of Catalysts

Figure 5:
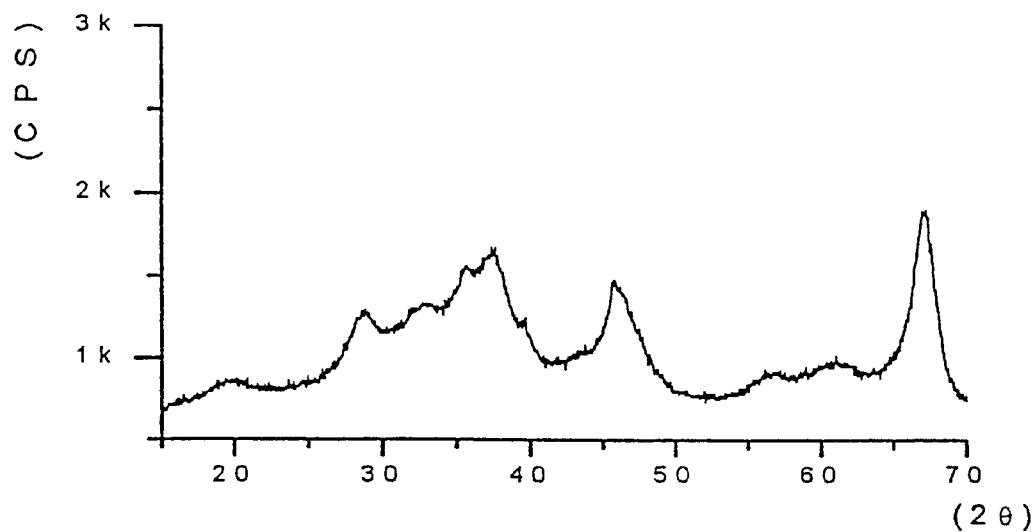
FIG. 5 is an X-ray diffraction pattern of the Cu—Al—O/ Ce—Al—O/$\gamma$-$Al_2O_3$.

An aqueous solution of $Cu^{2+}$ and $Al^{3+}$ nitrates in an appropriate molar ratio was prepared, to which citric acid was added in a citric acid/total metal ions molar ratio of 0.3–1.0, and then mixed uniformly to allow the complexation reaction taking place. A part of the complex solution was taken as required to impregnate the prepared Ce—Al—O/γ-$Al_2O_3$ solid. The impregnated solid was baked at 100–150° C. for 2–4 hrs., pyrolysated at 200–300° C. for 2–3 hrs, and then activated at 500–650° C. for 2–3 hrs. The final catalyst, Cu—Al—O/Ce—Al—O/γ-$Al_2O_3$, was obtained as spherical microparticles in black or black-gray after cooling (sample 1#, hereinafter). FIG. 5 shows its XRD pattern.

In order to examine the structure of the Cu—Al—O complex oxide, a complex oxide (sample 4#, hereinafter) containing Cu and Al in a Cu/Al molar ratio of 6.1 was prepared under the same condition for preparing the catalyst. The background of the sample's XRD pattern is normal and no $Al_2O_3$ phase can be detected. The analysis of the XRD pattern indicates that the sample 4# has the same structure but different lattice parameters with that of CuO, and shows a space group of $C_{2h}^6$—C2/c. The detail data are shown in Table 1.

TABLE 1

The lattice parameters of the sample 4# and copper oxide

|  | Sample 4# | CuO(JCPDS 5-661) |
|---|---|---|
| $a_0$ (Å) | 4.693 | 4.684 |
| $b_0$ (Å) | 3.429 | 3.425 |
| $c_0$ (Å) | 5.125 | 5.129 |
| $\beta_0$ | 99°26' | 99°28' |
| cell volume Vo (Å$^3$) | 81.365 | 81.159 |

It can be seen that the cell volume of the sample 4# is apparently larger than that of CuO, indicating that the $Al^{3+}$ ions entered into the crystal lattice, and the Cu—Al complex oxide having the crystal structure of CuO and the formula of $[Cu_{1-3x/2}Al_x\square_{x/2}]O$ was formed.

Figure 6:
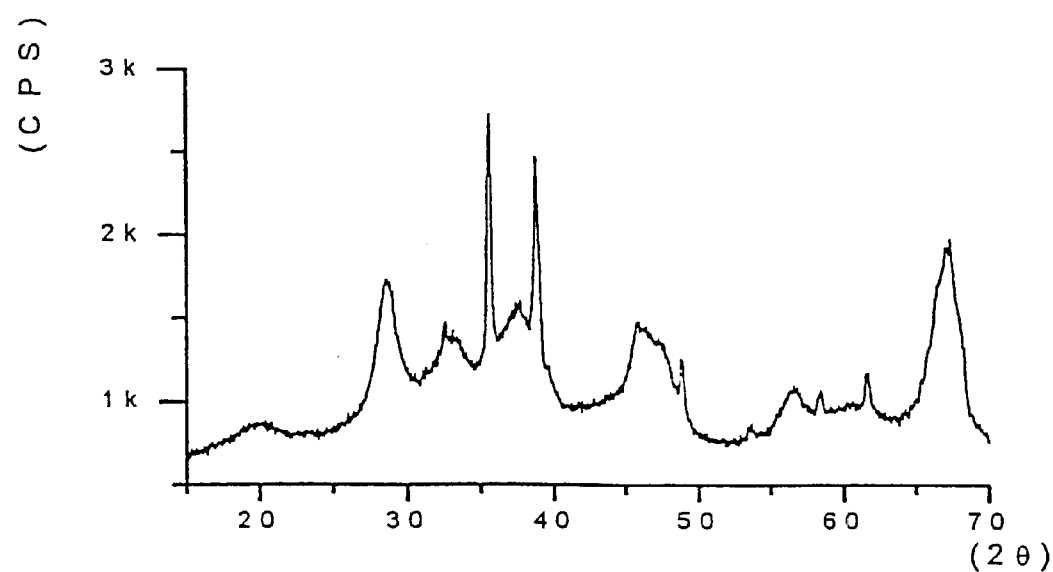
FIG. 6 is an X-ray diffraction pattern of the CuO/$CeO_2$/ $\gamma$-$Al_2O_3$.

In order to interpret the effect of introducing $Al^{3+}$ ions into active components, CuO was loaded on the $CeO_2$/γ-$Al_2O_3$ support according to the condition for preparing catalysts, and the XRD pattern of the product (sample 5#) CuO/$CeO_2$/γ-$Al_2O_3$ is shown in FIG. 6. It can be seen from FIG. 6 that the diffraction peaks of the CuO are distinctive, indicating that the CuO in sample 5# is distributed on the surface of $CeO_2$/γ-$Al_2O_3$ in a form of large grain with a particle size of larger than 2000 Å. On the other hand, no diffraction peak of CuO can be found in the XRD pattern of the prepared sample 1# (FIG. 5), showing that the active component of the catalyst of the present invention, Cu—Al—O, is dispersed on the surface of Ce—Al—O/γ-$Al_2O_3$ in cluster form.

The sample 5# was evaluated after hydrothermal aging treatment under the same condition as example 1(4)-b, the conversion of CO was determined to be 25%, and the hydrothermal stability was much lower than that of the sample 1#.

In order to reveal the interaction between the two complex oxides of Ce—Al—O and Cu—Al—O in the prepared catalysts, the values of the binding energy of Cu in the two systems were measured by using XPS.

In P. W. Park and J. S. Ledford, "The influence of surface structure on the catalytic activity of cerium promoted copper oxide catalysts on alumina: oxidation of carbon monoxide and methane", Catalysis Letters, 50(1998)41–48, the values of the $Cu2P_{2/3}$ of both the CuO/γ-$Al_2O_3$ and CuO/$CeO_2$/γ-$Al_2O_3$ were reported to be 935.1 eV determined by using XPS (the value of $Cu2P_{2/3}$ of the sample 5#, CuO/$CeO_2$/γ-

$Al_2O_3$, prepared in the present invention is 935.2 eV, consistent with the literature value), while the binding energy of Cu in $CuAl_2O_4$ was 935.0 eV. The values of the binding energy of Cu in both samples of $CuO/\gamma\text{-}Al_2O_3$ and $CuO/CeO_2/\gamma\text{-}Al_2O_3$ are all consistent with that in $CuAl_2O_4$, demonstrating that the $\gamma\text{-}Al_2O_3$ has a certain influence on the binding energy of Cu which isn't weakened by the existence of $CeO_2$, and most of CuO are attached on the $\gamma\text{-}Al_2O_3$ whether the surface of $\gamma\text{-}Al_2O_3$ are covered with $CeO_2$ or not.

The value of $Cu2P_{2/3}$ of the prepared sample 1#, Cu—Al—O/Ce—Al—O/γ—$Al_2O_3$, was measured to be 933.90 eV by using XPS, which is different with that of both $CuO/\gamma\text{-}Al_2O_3$ and $CuO/CeO_2/\gamma\text{-}Al_2O_3$, but is consistent with the value of 933.9 eV for CuO, indicating that the $\gamma\text{-}Al_2O_3$ support in sample 1# has little influence on the binding energy of Cu in the active components. This is due to that the most part of active components was attached to the microcrystals of the Ce—Al—O complex oxide rather than the surface of $\gamma\text{-}Al_2O_3$.

Therefore, it can be concluded that there exist high dispersed Cu—Al—O and high dispersed Ce—Al—O in the catalysts of the present invention. The strong interaction between the two complex oxides having imperfect structure endows the catalysts with high activity as well as high hydrothermal stability, particularly the hydrothermal stability at high temperature under the circumstance surrounded by the FCC catalysts, and hence improving the use value of the products.

The following examples are carried out so as to further illustrate the present invention, but they can not be conceived as limit to the scope of the invention.

EXAMPLES

Example 1

$\gamma\text{-}Al_2O_3$ with a water-absorbility of 0.55 was used as support, in which the particles with a particle size in the range of 40–80 μm constituted 70 wt % of the total support weight, and the proportion of the particles with a particle size larger than 80 μm was less than 20 wt %.

The procedures for preparing and evaluating the catalysts are as followings:

(1) 66.8 ml of 2.00 mol/L aqueous solution of $Ce(NO_3)_3$ was mixed with 8.3 ml of 2.00 mol/L aqueous solution of $Al(NO_3)_3$, then 15.8 g of citric acid ($C_6H_8O_7 \cdot H_2O$) and 190.0 ml of water were added to allow the complexation reaction taking place. The complex solution was used to impregnate 500 g of the aforesaid $\gamma\text{-}Al_2O_3$ support. The resulting impregnated support was baked at 120° C. for 2 hrs., pyrolysated at 280° C. for 2 hrs, and then activated at 680° C. for 3 hrs. After cooling, the solid of Ce—Al—O/$\gamma\text{-}Al_2O_3$ having the XRD pattern shown in FIG. 1 was obtained.

(2) 188.0 ml of 3.06 mol/L aqueous solution of $Cu(NO_3)_2$ and 43.1 ml of 2.14 mol/L aqueous solution of $Al(NO_3)_3$ were mixed, then 69.5 g of citric acid was added and mixed uniformly to allow the complexation reaction taking place. The complex solution was used to impregnate the above solid Ce—Al—O/$\gamma\text{-}Al_2O_3$, and the impregnated solid was baked at 110° C. for 3 hrs., pyrolysated at 250° C. for 2.5 hrs, and then activated at 580° C. for 2 hrs, to obtain the catalyst Cu—Al—O/Ce—Al—O/$\gamma\text{-}Al_2O_3$. The product is referred to as sample 1#, and its XRD pattern is shown in FIG. 5

(3) Determination of CO Conversion

The catalysts of the present invention can be used to convert CO into $CO_2$. By mixing 1.0 g sample 1# with 59.0 g of $\gamma\text{-}Al_2O_3$, placing the mixture in a fixed fluidized bed reactor, and introducing the mixed reactant gas in which the concentrations of $CO_2$, CO and $O_2$ were 3.2% (v), 5.3% (v), and 2.9% (v), respectively, and the balance was $N_2$, the conversion of CO was determined to be 100% at 593° C. and a space velocity of 40,000/hr.

In the FCC regenerator, three following reactions exist simultaneously:

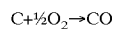

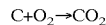

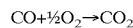

Since there always exists a certain partial pressure of $CO_2$ in the system, so the mixed reactant gas used in the evaluation test should contain an appropriate amount of $CO_2$ to simulate the ambient atmosphere in practical operation more closely.

(4) Evaluation of Hydrothermal Aging Test a) Sample 1#

8.0 g of sample 1# was weighted into a porcelain boat and heated in a tube heating furnace at 788° C. for 12 hrs under a mixed gas stream comprising 90% (v) of water vapor and 10% (v) of air at a space velocity of 15000/hr.

1.0 g of the sample after being treated under the above hydrothermal condition was admixed with 59.0 g of $\gamma\text{-}Al_2O_3$, placed in a fixed fluidized bed reactor, and evaluated under the condition of (3). The conversion of CO was determined to be 96%.

b) Mixture of the Sample 1# and the Fresh FCC Catalyst 2.0 g of the sample 1# was mixed with 6.0 g fresh FCC catalyst, and the mixture was treated under the hydrothermal condition of (4)-a). 4.0 g of the sample after hydrothermal treatment was mixed with 56.0 g of $\gamma\text{-}Al_2O_3$, and the mixture was, placed in a fixed fluidized-bed reactor to be evaluated under the condition of (3). The conversion of CO was determined to be 64%.

c). Mixture of the sample 1# and deactivated FCC catalyst

The FCC catalyst which was attached with more or less deposition of carbon after FCC reaction and needed to be regenerated is called deactivated FCC catalyst. The deactivated FCC catalyst used here was taken from the FCC unit without adding any combustion promoter, in which there no residual combustion promoter existed and its carbon content was about 1.0%.

Following the same manner as that of (4)-b), except that the 10% (v) of air in the mixed gas was replaced with $N_2$, and the fresh FCC catalyst was replaced with the deactivated FCC catalyst. The catalyst obtained after such hydrothermal treatment was evaluated under the condition described in (3), and the conversion of CO was determined to be 72%.

The combustion promoters used in industry are surrounded by a large amount of FCC catalyst during the practical operation. The test results demonstrate that the surface of the promoter was inevitably embedded in the main components (Al, Si) of the FCC catalyst, and the catalytic performance of the promoter will be destroyed gradually at the high temperature used in the hydrothermal treatment. This effect will be more serious in the fresh FCC catalyst than in the deactivated FCC catalyst. Therefore, the evaluation of the hydrothermal treatment using the mixture of the promoter sample with the fresh FCC catalyst and the deactivated FCC catalyst will be more close to the practical situation of the promoter in the FCC unit.

(5) Pilot Test (Simulate the Condition used in Industry)

In this comparative test, the sample 1# of the present invention and a conventional combustion promoter containing 500 ppm Pt were evaluated under the same condition. The pilot test was carried out on an XTL-5 type of small-sized FCC testing equipment with a riser, manufactured by Luoyang Petroleum-Chemical Engineering Co. China. The total inventory of the equipment for the FCC catalyst is 4.0 Kg, and the catalyst used was a regenerator for LV-23 FCC catalyst manufactured by Lanzhou Petroleum Chemical Catalyst Factory, China, which was taken from an FCC unit without adding any combustion promoter. Both amounts of sample 1[#] and the conventional Pt combustion promoter are 3000 ppm, respectively. The raw oil was vacuum wax oil containing 25% of vacuum residual oil obtained from Daqing, China. The operation conditions are shown in Table 2.

TABLE 2

The operation condition of FCC

| | Pt promotor | Sample 1# | | Pt promotor | Sample 1# |
|---|---|---|---|---|---|
| reaction temperature (° C.) | 510 | 510 | regeneration temperature(° C.) | 680 | 680 |
| reaction pressure (mol/LPa) | 0.115 | 0.115 | temp. of regenerator (° C.) | 660 | 660 |
| flow rate of the feed oil (Kg/hr) | 1.203 | 1.196 | preheating temp. of raw oil(° C.) | 280 | 280 |
| reaction time(s) | 2.08 | 2.07 | temp. of oil/catalyst mixture(° C.) | 520 | 520 |
| catalyst/oil ratio | 6.67 | 6.62 | main air flow for carbon(coke)-burning (1/hr) | 720 | 720 |

TABLE 3

The composition of the stack gas

| | Pt promotor | Sample 1# |
|---|---|---|
| $O_2$ (% vol) | 2.12 | 2.24 |
| CO (% vol) | 0.22 | 0.26 |
| $NO_x$ (ppm) | 723 | 371 |

The data demonstrate that the sample 1# possesses the combustion-promoting effect camparable with that of the Pt promotor, and has the advantage of reducing the $NO_x$ in the stack gas by 50%, being favorable to the air cleaning and reducing the acid corrosion of the equipment.

Example 2

(1) 67.9 ml Of 2.00 mol/L aqueous solution of $Ce(NO_3)_3$ was mixed with 5.1 ml of 2.00 mol/L aqueous solution of $Al(NO_3)_3$, then 15.3 g of citric acid and 192.5 ml of water were added to allow the complexation reaction taking place. The complex solution was used to impregnate 500 g of the support used in Example 1. The resulting impregnated support was baked, pyrolysated and activated under the conditions described in step (1) of the Example 1 to obtain the solid of Ce—Al—O/γ-$Al_2O_3$-a.

(2) 195.4 ml of 3.06 mol/L aqueous solution of $Cu(NO_3)_2$ and 21.9 ml of 2.14 mol/L aqueous solution of $Al(NO_3)_3$ were mixed, then 67.8 g of citric acid and 15.7 ml of water were added and mixed uniformly to allow the complexation reaction taking place. The complex solution was used to impregnate the above solid of Ce—Al—O/γ-$Al_2O_3$-a, and the impregnated solid was baked, pyrolysated and activated under the condition described in step (2) of the Example 1 to obtain the catalyst.

(3) The obtained catalyst was evaluated following the manner described in Example 1(3), and the conversion of CO was determined to be 96%. After hydrothermal aging treatment under the condition described in Example 1(4)-b), the conversion of CO was determined to be 51%.

Example 3

(1) 57.3 ml Of 2.20 mol/L aqueous solution of $Ce(NO_3)_3$ was mixed with 21.0 ml of 2.00 mol/L aqueous solution of $Al(NO_3)_3$, then 17.6 g of citric acid and 185.8 ml of water were added to allow the complexation reaction taking place. The complex solution was used to impregnate 500 g of the support used in Example 1. The resulting impregnated support was baked, pyrolysated and activated under the condition described in step(1) of the Example 1 to obtain the solid of Ce—Al—O/γ-$Al_2O_3$-b.

(2)151.6 ml of 3.51 mol/L aqueous solution of $Cu(NO_3)_2$ and 71.2 ml of 2.14 mol/L aqueous solution of $Al(NO_3)_3$ were mixed, then 71.8 g of citric acid and 7.7 ml of water were added to allow the complexation reaction taking place. The complex solution was used to impregnate the above solid of Ce—Al—O/γ-$Al_2O_3$-b, and the impregnated solid was baked at 100° C. for 3 hrs, pyrolysated at 270° C. for 2 hrs, and activated at 600° C. for 2 hrs to obtain the catalyst.

The catalyst was evaluated following the manner described in Example 2(3), and the conversion of CO were determined to be 93% and 54%, respectively.

Example 4

(1)28.4 ml of 2.00 mol/L aqueous solution of $Ce(NO_3)_3$ was mixed with 2.1 ml of 2.00 mol/L aqueous solution of $Al(NO_3)_3$, then 6.4 g of citric acid and 240.0 ml of water were added to allow the complexation reaction taking place. The complex solution was used to impregnate 500 g of the support used in Example 1. The resulting impregnated support was baked at 140° C. for 1.5 hrs, pyrolysated at 300° C. for 2 hrs, and activated at 700° C. for 2 hrs, to obtain the solid of Ce—Al—O/γ-$Al_2O_3$-c.

(2)75.8 ml of 3.51 mol/L aqueous solution of $Cu(NO_3)_2$ and 35.6 ml of 2.14 mol/L aqueous solution of $Al(NO_3)_3$ were mixed, then 35.9 g of citric acid and 141.6 ml of water were added to allow the complexation reaction taking place. The complex solution was used to impregnate the above solid of Ce—Al—O/γ-$Al_2O_3$-c, and the impregnated solid was baked at 100° C. for 3 hrs, pyrolysated at 220° C. for 3 hrs, and activated at 600° C. for 2.5 hrs to obtain the catalyst.

The catalyst was evaluated following the manner described in Example 2(3), and the CO conversions were determined to be 89% and 50%, respectively.

Example 5

The γ-$Al_2O_3$ with a water-absorbility of 0.62 ml/g was used as support, in which the particles with a size of 40–80 μm constituted of 70 wt % of the support, and the particles with a size larger than 80 μm is less than 15 wt %.

(1)105.8 ml Of 2.00 mol/L aqueous solution of $Ce(NO_3)_3$ was mixed with 35.2 ml of 2.00 mol/L aqueous solution of $Al(NO_3)_3$, then 29.6 g of citric acid and 118.4 ml of water were added to allow the complexation reaction taking place. The complex solution was used to impregnate 500 g of the above support, and the impregnated support was baked, pyrolysated and activated under the condition described in Example 4(1) to obtain the solid of Ce—Al—O/γ-Al$_2$O$_3$-d.

(2) 219.9 ml of 3.81 mol/L aqueous solution of Cu(NO$_3$)$_2$ and 30.6 ml of 2.14 mol/L aqueous solution of Al(NO$_3$)$_3$ were mixed, then 94.8 g of citric acid was added to allow the complexation reaction taking place. The complex solution was used to impregnate the above solid of Ce—Al—O/γ-Al$_2$O$_3$-d, and the impregnated solid was baked, pyrolysated and activated under the condition described in Example 3(2) to obtain the catalyst.

The catalyst was evaluated in the manner described in Example 2(3), and the CO conversions were determined to be 98% and 56%, respectively.

Example 6

For comparison with the present invention, a catalyst having no Al$^{3+}$ ions in its active component, CuO/CeO$_2$/γ-Al$_2$O$_3$, was prepared.

(1) 8.71 ml of 2.01 mol/L aqueous solution of Ce(NO$_3$)$_3$ was mixed uniformly with 24.3 ml of water, then the mixed solution was used to impregnate 60 g of the support used in Example 1. The resulting impregnated support was baked, pyrolysated and activated under the conditions described in Example 1(1) to obtain the solid of CeO$_2$/γ-Al$_2$O$_3$.

(2). 22.6 ml of 3.36 mol/L aqueous solution of Cu(NO$_3$)$_2$ was mixed uniformly with 10.4 ml of water, and the mixed solution was used to impregnate the above solid of CeO$_2$/γ-Al$_2$O$_3$. The impregnated solid was baked, pyrolysated and activated under the condition described in Example 1(2) to obtain the catalyst CuO/CeO$_2$/γ-Al$_2$O$_3$ (see FIG. 6).

The obtained catalyst was evaluated following the manner described in Example 2(3), and the CO conversions were determined to be 90% and 25%, respectively.

What is claimed is:

1. A non-noble metal complex oxide combustion catalyst characterized in that said catalyst comprises Ce—Al complex oxide and Cu—Al complex oxide successively loaded on an aluminum oxide support, and the ratio of the loading weight is 0.02–0.10 for Ce—Al—O/Al$_2$O$_3$ and 0.05–0.15 for Cu—Al—O/Al$_2$O$_3$, respectively.

2. A catalyst according to claim 1 characterized in that said ratio of the loading weight is 0.04–0.06 for Ce—Al—O/Al$_2$O$_3$ and 0.08–0.11 for Cu—Al—O/Al$_2$O$_3$, respectively.

3. A catalyst according to claim 1 characterized in that the Ce—Al complex oxide covers a surface of the aluminum oxide support in the form of nanoparticles.

4. A catalyst according to claim 1 characterized in that a structure of said Ce—Al complex oxide can be represented by the general formula [I]:

$$[Ce_{1-y}Al_y][O_{2-y/2}\square_{y/2}] \qquad [I]$$

wherein y=0.05–0.30, □ represents the vacancy in the structure.

5. A catalyst according to claim 1 characterized in that said Cu—Al complex oxide is dispersed in cluster form on the aluminum oxide support, wherein the support is pre-covered with particles of Ce—Al complex oxide.

6. A catalyst according to claim 1 characterized in that a structure of said Cu—Al complex oxide can be represented by the general formula [II]:

$$[Cu_{1-3x/2}Al_x\square_{x/2}]O \qquad [II]$$

wherein x=0.05–0.23, and □ represents the vacancy in the structure.

7. A catalyst according to claim 1 characterized in that the aluminum oxide support has a particle size of 10–100 μm.

8. A catalyst according to any one of claims 1 to 7 characterized in that the aluminum oxide support is γ-Al$_2$O$_3$.

9. A process for preparing a non-noble metal Cu—Al/Ce—Al complex oxide combustion catalyst for carbon monoxide, characterized in that the process comprises the steps of:

A. mixing an aqueous solution containing Ce and Al compounds with citric acid or its aqueous solution in a citric acid/total Ce—Al metal ions molar ratio of 0.3–1.0 and impregnating an aluminum oxide support with the mixed solution; baking the impregnated support at 100–140° C. for 2–4 hours; pyrolizing at 200–300° C. for 2–3 hours; and activating at 600–750° C. for 2–5 hours to obtain a solid aluminum oxide support covered with nanoparticles of Ce—Al complex oxide; and B. mixing an aqueous solution containing Cu and Al compounds with citric acid or its aqueous solution in a citric acid/total Cu—Al metal ions molar ratio of 0.3–1.0 and impregnating the solid support obtained in step (A) with the mixed solution; baking the impregnated solid at 100–150° C. for 2–4 hours; pyrolizing at 200–300° C. for 2–3 hours; and activating at 500–650° C. for 2–3 hours to obtain the final catalyst which comprises Cu—Al complex oxide further dispersed on a surface of the aluminum oxide support pre-covered with nanoparticles of Ce—Al complex oxide.

10. A process according to claim 9 characterized in that said Ce compound is a salt.

11. A process according to claim 10 characterized in that said Ce salt is cerous nitrate.

12. A process according to claim 9 characterized in that said Cu compound is a salt.

13. A process according to claim 12 characterized in that said Cu salt is copper nitrate.

14. A process according to claim 9 characterized in that said Al compound is a salt.

15. A process according to claim 14 characterized in that said Al salt is aluminum nitrate.

16. A process according to claim 9 characterized in that the concentration in the aqueous solution is 0.50–4.00 mol/L for Ce compound, 1.00–2.20 mol/L for Al compound, and 0.50–4.00 mol/L for Cu compound.

17. A process according to claim 16 characterized in that the concentration in the aqueous solution is 1.00–2.00 mol/L for Ce compound, 1.50–2.00 mol/L for Al compound, and 2.00–3.50 mol/L for Cu compound.

18. A process according to claim 9 characterized in that the particle size of the aluminum oxide support is 10–200 μm.

19. A process according to claim 18 characterized in that said aluminum oxide support is γ-Al$_2$O$_3$ in microspheric form.

20. A process according to any one of claims 9–18 characterized in that the weight ratio is 0.02–0.10 for Ce—Al—O/Al$_2$O$_3$ and 0.05–0.15 for Cu—Al—O/Al$_2$O$_3$, respectively, in the final catalyst.

21. A process according to claim 20 characterized in that the weight ratio is 0.04–0.06 for Ce—Al—O/Al$_2$O$_3$ and 0.08–0.11 for Cu—Al—O/Al$_2$O$_3$, respectively, in the final catalyst.

22. A method of using a catalyst according to any one of claims 1–8 comprising the step of using the catalyst as combustion catalyst for carbon monoxide in FCC process of petroleum refining.

* * * * *